March 16, 1954   C. W. J. HEDBERG   2,672,207
ELECTRICAL PRECIPITATOR AND EXTENDED SURFACE
ELECTRODE STRUCTURE THEREFOR
Filed Dec. 5, 1950   4 Sheets-Sheet 1
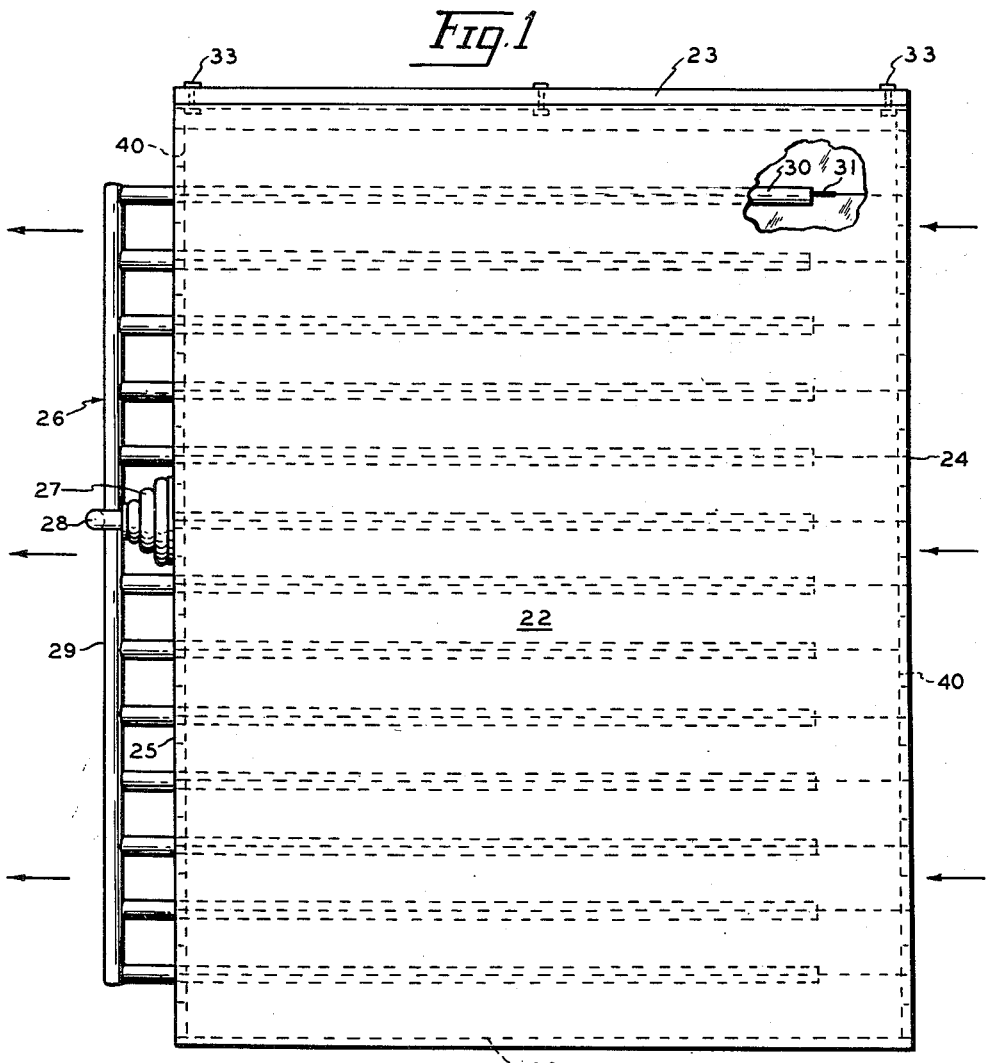
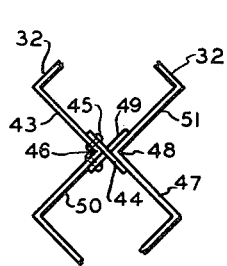
Fig.8
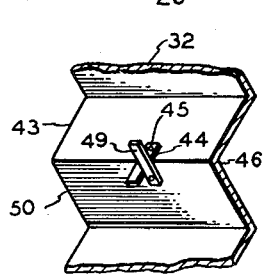
Fig.9
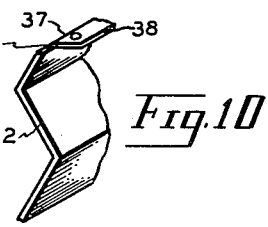
Fig.10
INVENTOR
CARL W. J. HEDBERG
BY Stowell & Evans
ATTORNEYS

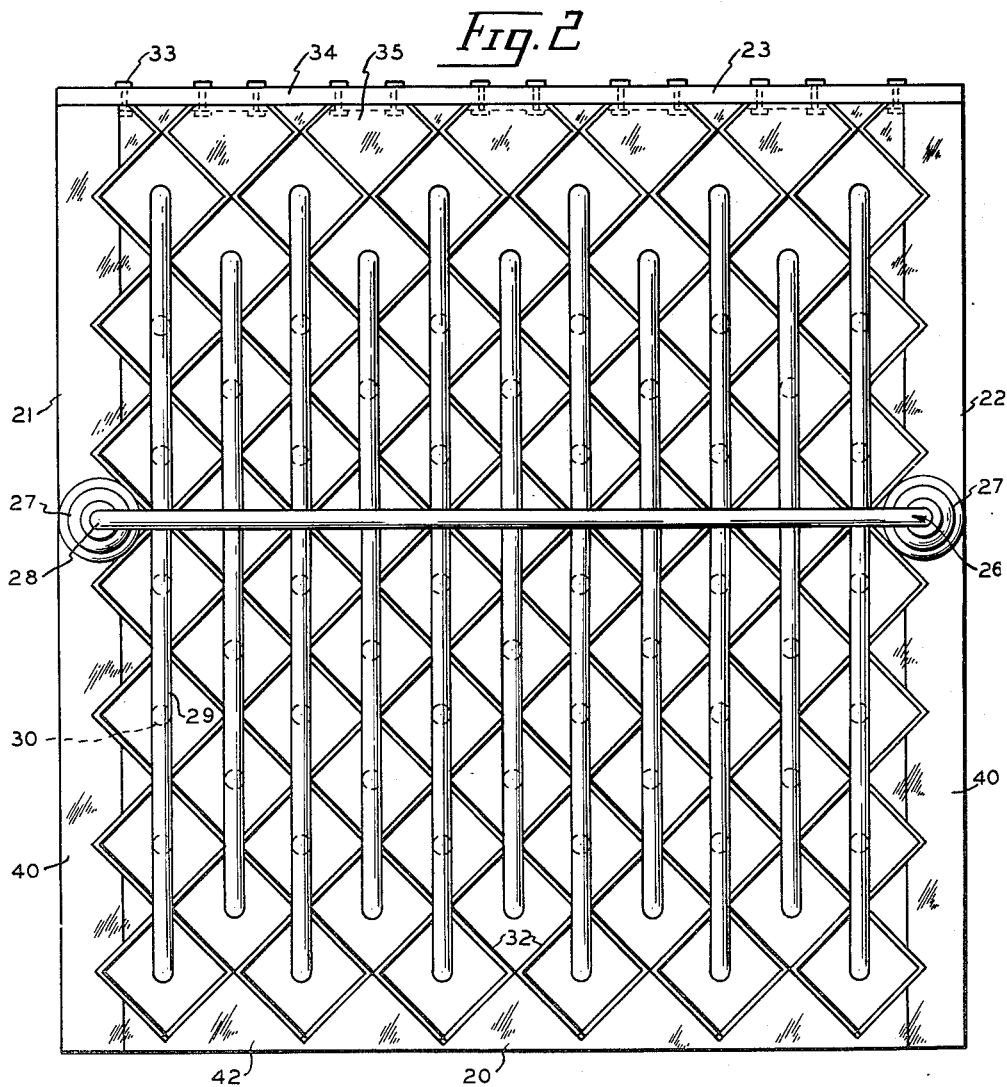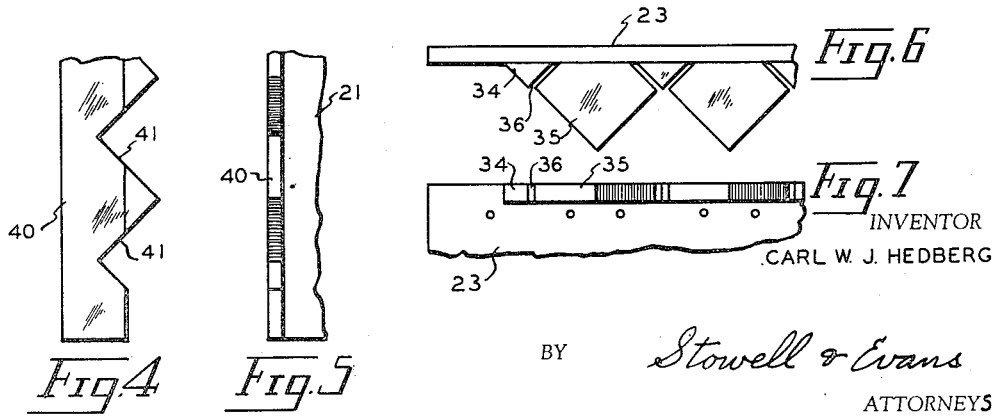

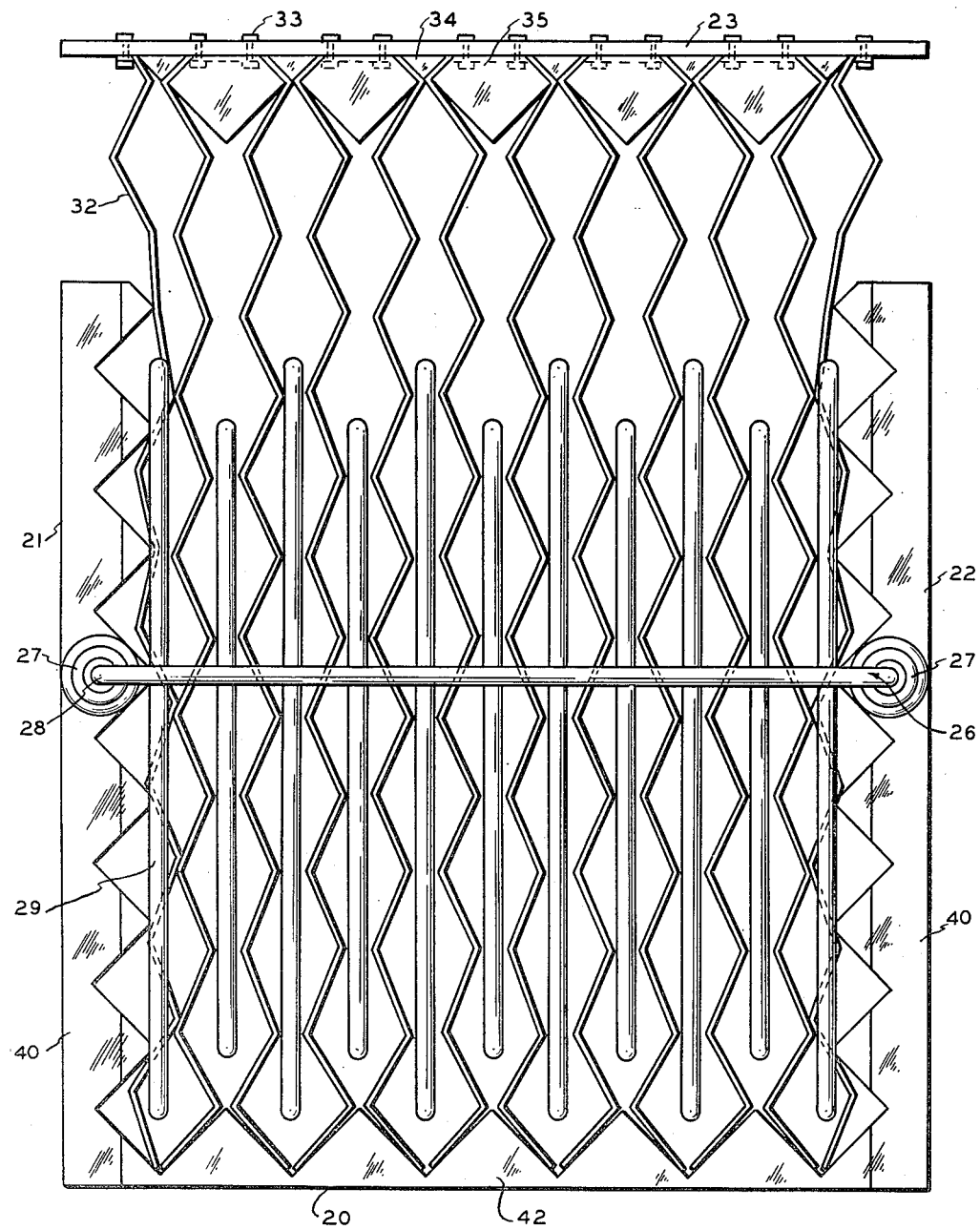

Patented Mar. 16, 1954

2,672,207

UNITED STATES PATENT OFFICE 2,672,207

ELECTRICAL PRECIPITATOR AND EXTENDED SURFACE ELECTRODE STRUCTURE THEREFOR

Carl W. J. Hedberg, Bound Brook, N. J., assignor to Research Corporation, New York, N. Y., a corporation of New York Application December 5, 1950, Serial No. 199,234

9 Claims. (Cl. 183—7)

This invention relates to electrical precipitators and to an extended surface electrode structure therefor. More particularly, the invention relates to an electrical precipitator wherein the high tension electrodes extend horizontally and the extended surface electrodes are sheet members that are formed to provide a plurality of independent gas passages each of which includes one of the high tension electrodes.

An object of the invention is to provide an electrical precipitator having an extended surface electrode structure that can be readily removed from and replaced in the precipitator without disturbing the high tension electrode assembly.

Another object is to provide an extended surface electrode and electrode assembly that is fabricated from inexpensive materials whereby the electrodes may be discarded when they become dirty and replaced economically.

Another object is to provide an electrical precipitator wherein the extended surface electrodes may be simply and speedily replaced with consequent saving of down time and increase in overall operating efficiency of the precipitator.

These and other aims and advantages of the invention are realized in an electrical precipitator having an extended surface electrode structure including a plurality of sheet members rectilinear in one direction and warped in a direction at right angles thereto to provide a plurality of parallel gas conduits, the sheet members being easily flexed in the direction of warping. Low work input is required to flex the sheet members in the manner of a bellows. The sheet members are sufficiently flexible at least in the indicated direction so that when raised by their tops and suspended with the rectilinear surface elements extending horizontally, the sheet members straighten out to a substantial extent by virtue of their own weight. Thus, the sheet members are readily inserted in an electrical precipitator without the necessity of removing the high tension electrode assembly.

The extended surface electrode members may be made of flexible materials such as heavy paper, paper board or other water-laid fibrous material, synthetic resin sheets, thin gauge metal sheets and the like. The required flexibility is inherent in such materials provided the sheets are sufficiently thin. Such thin sheets are warped or folded in the desired configuration and retain a more or less permanent set. Heavier gauge material may be employed if the sheet material is scored and/or folded along definite lines so that it can be easily flexed in the manner of a bellows. Other ways of obtaining the necessary sheet flexibility will become apparent as the description proceeds.

The invention will be described by way of illustration with reference to the drawings in which:

Fig. 1 is a side elevational view of an electrical precipitator including extended surface electrodes in accordance with the invention;

Fig. 2 is a left end view of the precipitator shown in Fig. 1;

Fig. 3 is a left end view of the precipitator of Figs. 1 and 2 showing the top of the precipitator in raised position and the extended surface electrodes elongated;

Fig. 4 is a detail view of a side former for the extended surface electrode structure;

Fig. 5 is a right side view of the former shown in Fig. 4;

Fig. 6 is a fragmentary detail view of a top former for the extended surface electrode structure;

Fig. 7 is a bottom view of the former shown in Fig. 6;

Fig. 8 is a fragmentary end view of a portion of the electrode structure showing a positioning device;

Fig. 9 is a perspective view of a portion of an extended surface electrode having a positioning device;

Fig. 10 is a fragmentary perspective view of the top of one electrode sheet.

Figure 11:
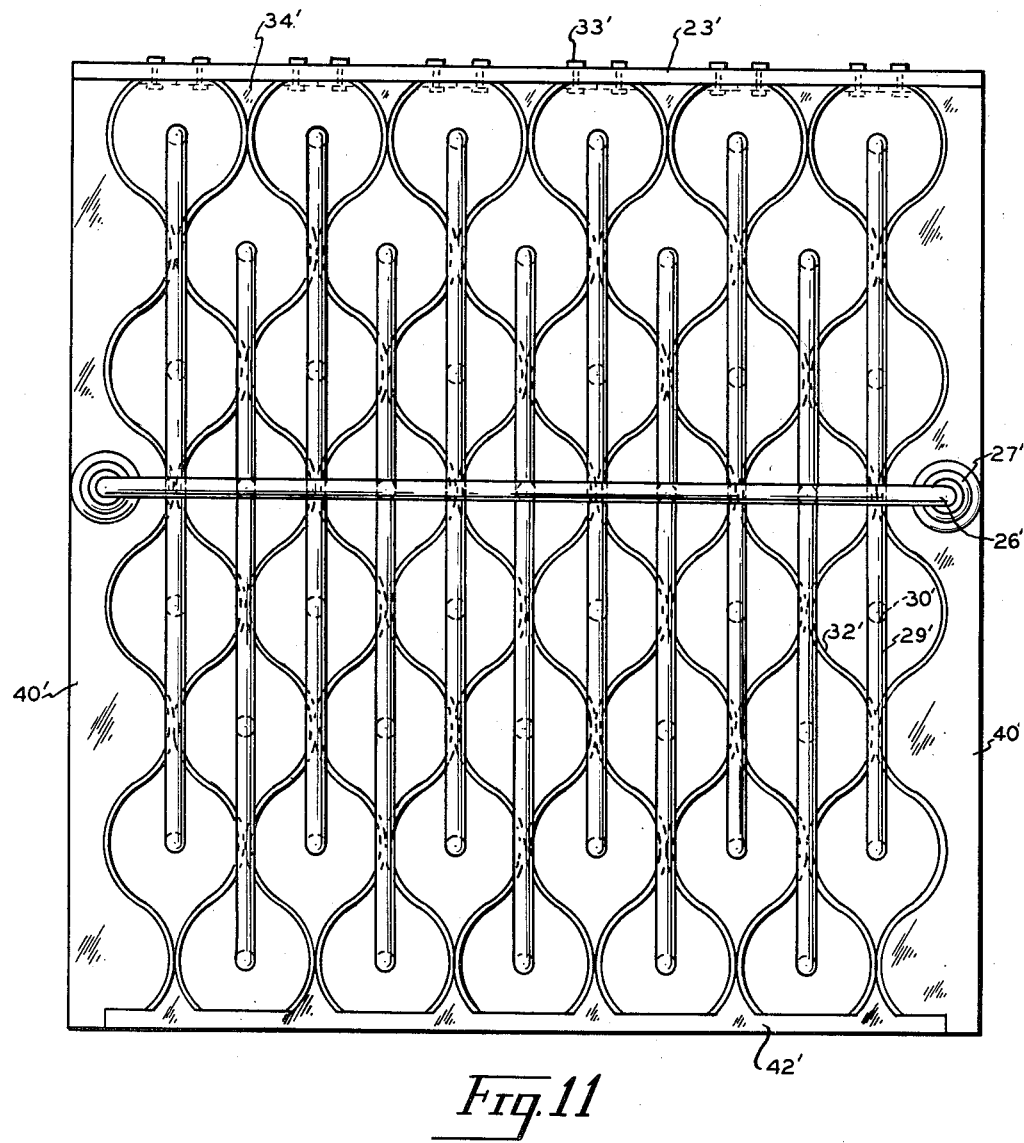
Fig. 11 is an end view of a modified form of precipitator in accordance with the invention.

Referring to the drawings, particularly to Figs. 1, 2 and 3 thereof, the electrical precipitator shown is of a type known as a single-stage, horizontal gas flow precipitator. It has a casing including a bottom 20, side walls 21 and 22 and a top 23. The ends of the casing, at the left and right of Fig. 1, are left open to provide a gas inlet opening 24 and a gas outlet opening 25. By the employment of the usual gas ducts and means for moving gas (not shown) a stream of gas to be cleaned is passed through the precipitator from right to left as indicated by the arrows in Fig. 1.

The precipitator has a high tension electrode assembly designated by the general reference numeral 26. This assembly is supported on insulators 27 mounted on the casing at the outlet end 25. A metallic bar 28 extends horizontally across the precipitator between the insulators. Affixed to the horizontal bar, as by welding, is a plurality of horizontally spaced, vertically extending bars 29 forming a grillwork. Projecting from each of the vertical bars 29 are cantilever rods 30 forming high tension electrodes. These bars extend horizontally through the precipitator for substantially the full length of the casing and terminate in fine wire projections 31 forming electrical discharge points. As seen in Fig. 2, the high tension electrodes are arranged in a regular pattern across the precipitator defining, in cross section, a pattern composed of a plurality of adjacent squares.

Complementary extended surface electrodes 32 are provided. These are fabricated of paperboard or the like and comprise sheets of the material folded along regularly spaced horizontal lines. The electrode sheets extend from top to bottom and from end to end of the precipitator casing and are arranged to provide a plurality of parallel flues or gas passages, into each of which one of the high tension electrodes projects.

The sheet members 32 are attached to the top 23 of the casing by rivets 33. Referring to Figs. 6 and 7 it is seen that the top 23 has members 34 and 35 located at both inlet and outlet ends that assist in properly spacing the sheet members and in forming the assembly of sheet electrodes in the precipitator. The members 34 and 35 are spaced along the under side of the top 23 to provide slots 36 through which the top portions of the vertical edges of the sheet electrodes extend. As shown in Fig. 10, the top edge of the electrode 32 is folded along the line 37 forming a horizontal flange 38 that lies against the bottom surface of the top 23. The flange is cut away at the end to form a notch 39 allowing the edge of the sheet to project into the slot 36.

The knee folds of the sheet electrodes at each side of the precipitator are formed and supported in vertical members 40. At least one such member is located at each end of each side wall 21 and 22. A member 40 is shown in fragmentary detail in Figs. 4 and 6; it has notches 41 spaced to receive alternate knee folds of an adjacent sheet electrode.

Similarly notched support and forming members 42 are provided at the ends of the precipitator casing to receive and hold the bottom panels of the sheet electrodes.

Referring particularly to Figs. 2 and 3, the way in which the extended surface electrode structure is removed from and installed in the precipitator will be explained. In Fig. 2, the extended surface electrode structure is shown in assembled position in the precipitator. As seen in Fig. 3, the top 23, from which the sheet electrodes are suspended, is separate from the rest of the casing and may be lifted bodily upwards therefrom. As the top is raised, the folded electrode sheets straighten out, as shown, and the top and sheet electrode assembly may be raised entirely clear of the precipitator casing without disturbing any other parts of the precipitator. The sheet electrodes are removed in this manner when they have become dirty and require cleaning or replacement. After the assembly has been removed, the used electrodes may be unfastened from the top, discarded, and replaced by a new set. The reconstituted assembly is then lowered into operative position in the precipitator. The top, bottom, and side forming members described hereinbefore assist in establishing proper alignment of the folds in the sheet electrodes so that when the top 23 is finally in position, the electrode assembly assumes the arrangement seen in Fig. 2. Although some minor manual adjustment of the positions of the knee folds may be required in making an installation, such adjustment is very easily accomplished.

As shown in Figs. 8 and 9, clips may be provided to support and position knee folds of the sheet members that are not given direct support by the side and bottom members referred to hereinbefore but are supported against a knee fold of an adjacent sheet member. One panel 43 of a sheet member 32 has a short bar 44 attached to it by means of a rivet 45 or other fastening. This bar projects beyond the knee fold 46 and is engaged beneath the panel 47 of an opposed knee fold 48. A similar short bar 49 is attached to the panel 50 and projects beyond the knee fold 46 to overlie the panel 51 of the opposed knee fold 48. Thus the knee fold 48 is firmly supported by the crossed bars 44 and 49 that are carried by the knee fold 46. As best seen in Fig. 9, the bars 44 and 49 may be positioned beside one another. It will be understood that when the sheet member 32 is extended so that the panels lie in a plane, the bars 44 and 49 will be folded back to lie flat against the surface of the sheet, thus facilitating insertion of the sheet into a precipitator. As the sheet falls into folded position, the bars are extended in crossed relation to receive an opposed knee fold. The clips described may be used at various points in the electrode assembly where additional support is desired.

The flexibility of the sheet electrodes may be enhanced by scoring the sheet along the fold lines such as at the knee fold 46 or 48 of Fig. 8.

In the form of the invention illustrated in Fig. 11, the precipitator is shown in end view looking at the gas outlet end of the casing. Parts that have counterparts in the precipitator of Figs. 1 to 3 are designated in Fig. 11 by similar primed reference numerals.

Since the form of the invention of Fig. 11 differs from that of Figs. 1 to 3 essentially only in the manner of warping of the sheet electrodes, it is sufficient to describe only the differences between the two. In assembled relation, as seen in Fig. 11, the sheet electrodes 32' are sinuously warped instead of being angularly warped along fold lines. The top formers 34', side forming members 40' and bottom forming members 42' are curved at their points of contact with the sheet electrodes to conform to the curvature of the latter.

It will be understood that when the top 23' is raised, the flexibility of the sheet electrodes causes them to straighten out to a large extent and to be easily removed from the precipitator. The sheet electrodes preferably are given a preliminary permanent set approaching the desired warped configuration finally acquired when they are assembled in the precipitator. This preliminary warping assures that the assembled structure will provide the necessary mutual support as between the several sheet members and that the gas passages formed by the assembly will be properly centered with respect to the high tension electrodes 30'.

Electrode structures providing both square and substantially circular gas passages have been shown by way of illustration. It will be apparent, however, that the sheet electrodes may be warped to provide gas passages having other cross-sectional shapes such as hexagonal or rhombohedral.

I claim:

1. An electrical precipitator comprising an extended surface electrode structure including a plurality of sheet members rectilinear in one direction and warped in a direction at right angles thereto to provide a plurality of parallel gas conduits, said sheet members being flexible in the direction of warping so that when raised by their tops and suspended with the rectilinear surface elements extending horizontally, the sheet members straighten out to a substantial extent by virtue of their own weight, a removable common top panel, and means securing said extended surface electrodes to said top panel in a direction parallel to their warpage.

2. An electrical precipitator comprising a housing, an extended surface electrode structure in said housing including a plurality of sheet members rectilinear in one direction and warped in a direction at right angles thereto to provide a plurality of parallel gas conduits, said sheet members being flexible in the direction of warping so that when raised by their tops and suspended with the rectilinear surface elements extending horizontally the sheet members straighten out to a substantial extent by virtue of their own weight, and guide members along the sides of the housing for forming the sheets into their plurality of parallel gas conduits.

3. An electrical precipitator comprising a housing supporting a discharge electrode system and an extended surface electrode structure forming a plurality of parallel gas conduits about the discharge electrode system, said extended surface electrode structure including a plurality of sheet members rectilinear in one direction and warped in a direction at right angles thereto to provide the plurality of parallel gas conduits, said sheet members being bendable in the direction of warping so that when raised by their top edges the sheet members straighten out permitting their removal from about the discharge electrode system.

4. An electrical precipitator as defined in claim 3 wherein said sheet members are warped along parallel fold lines.

5. An electrical precipitator as defined in claim 3 wherein said sheet members are sinuously warped.

6. An electrical precipitator as defined in claim 3 including a removable common top panel, and means securing said extended surface electrodes to said top panel in a direction parallel to their warpage.

7. An electrical precipitator as defined in claim 6 including guide members along the top panel, sides and bottom of the housing for forming the sheets into their plurality of parallel gas conduits.

8. An electrical precipitator comprising a housing and an extended surface electrode structure including a plurality of sheet members rectilinear in one direction and creased in a direction at right angles thereto to provide a plurality of parallel gas conduits, said sheet members being flexible and bendable along the creases and guide members at the top, sides, and bottom of the housing for forming the sheets into the plurality of parallel gas conduits.

9. An electrical precipitator comprising an extended surface electrode structure including a plurality of sheet members rectilinear in one direction and folded in a direction at right angles thereto along parallel fold lines equidistantly spaced to provide a plurality of parallel gas conduits having square cross-sections, said sheet members being easily flexed along the fold lines, positioning clips comprising a pair of bar members affixed to one of said sheet members on opposite sides of a fold line, and projecting in crossed relation beyond said fold line to engage an adjacent sheet member on opposite side of an opposed fold line.

CARL W. J. HEDBERG.

References Cited in the file of this patent

UNITED STATES PATENTS

| Number | Name | Date |
|---|---|---|
| 2,443,780 | Wintermute | June 22, 1948 |
| 2,565,458 | Weisz | Aug. 21, 1951 |